United States Patent
Field

(10) Patent No.: US 12,079,842 B2
(45) Date of Patent: *Sep. 3, 2024

(54) METHOD, APPARATUS AND SYSTEM FOR FACILITATING TARGETED CONTENT DELIVERY

(71) Applicant: Novatiq Technologies Limited, Cwmbran (GB)

(72) Inventor: Tanya Field, Cwmbran (GB)

(73) Assignee: Novatiq Technologies Limited, Cwmbran (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/307,561

(22) Filed: Apr. 26, 2023

(65) Prior Publication Data

US 2023/0281670 A1 Sep. 7, 2023

Related U.S. Application Data

(63) Continuation of application No. 16/795,913, filed on Feb. 20, 2020, now Pat. No. 11,669,868, which is a (Continued)

(30) Foreign Application Priority Data

Aug. 22, 2017 (GB) ..................... 1713470

(51) Int. Cl.
*G06Q 30/02* (2023.01)
*G06Q 30/0251* (2023.01)
(Continued)

(52) U.S. Cl.
CPC ..... *G06Q 30/0269* (2013.01); *G06Q 30/0255* (2013.01); *H04L 67/52* (2022.05); *H04L 67/55* (2022.05)

(58) Field of Classification Search
CPC ............ G06Q 30/0269; G06Q 30/0255; H04L 67/52; H04L 67/55

See application file for complete search history.

(56) References Cited

U.S. PATENT DOCUMENTS

| | | |
|---|---|---|
| 2008/0235351 A1 | 9/2008 | Banga et al. |
| 2008/0255944 A1 | 10/2008 | Shah et al. |

(Continued)

FOREIGN PATENT DOCUMENTS

| | | |
|---|---|---|
| CN | 101513015 A | 8/2009 |
| WO | 2016045071 A1 | 3/2016 |

OTHER PUBLICATIONS

International Search Report and Written Opinion dated Nov. 14, 2018 for PCT Application No. PCT/GB2018/052378.

(Continued)

*Primary Examiner* — Scott C Anderson
(74) *Attorney, Agent, or Firm* — EIP US LLP

(57) ABSTRACT

A method is described of facilitating targeted content delivery in a network comprising a service provider network (SPN) and a user profile data database external to the SPN. The method comprises: receiving, from a demand side platform, segment definition data comprising a list of user attributes and corresponding user attribute values associated with a targeted content delivery process; and communicating, to a server, the segment definition data, wherein the server has access to the database, to identify one or more candidate users to be targeted based on matching the user attribute values with user attribute values in the database. The method also comprises receiving, from the server, a list of identifiers, wherein each identifier is usable to identify one or more candidate users to be targeted; and communicating the list of identifiers to an entity in the SPN which is responsible for facilitating the delivery of targeted content.

16 Claims, 9 Drawing Sheets

Related U.S. Application Data continuation of application No. PCT/GB2018/052378, filed on Aug. 22, 2018.

(51) Int. Cl.
  *H04L 67/52* (2022.01)
  *H04L 67/55* (2022.01)

(56) References Cited

U.S. PATENT DOCUMENTS

| | | |
|---|---|---|
| 2008/0281711 A1 | 11/2008 | Bridges et al. |
| 2011/0197227 A1 | 8/2011 | Rouse et al. |
| 2012/0197709 A1 | 8/2012 | Kendall et al. |
| 2012/0226552 A1 | 9/2012 | Seenichamy |
| 2012/0331102 A1 | 12/2012 | Ertugrul |
| 2013/0138569 A1 | 5/2013 | Yan et al. |
| 2014/0074629 A1 | 3/2014 | Rathod |
| 2014/0358698 A1* | 12/2014 | Murphy ............ G06Q 30/0275 705/14.71 |
| 2015/0106442 A1 | 4/2015 | Baldachin et al. |
| 2015/0379555 A1* | 12/2015 | Dua .................... G06Q 30/0269 705/14.41 |
| 2016/0364762 A1 | 12/2016 | Maugans, III |
| 2016/0364767 A1* | 12/2016 | Maugans, III ........ G06F 21/316 |
| 2017/0083941 A1* | 3/2017 | Biswas .............. G06Q 30/0275 |
| 2017/0142214 A1 | 5/2017 | Nanavati et al. |
| 2017/0237600 A1* | 8/2017 | Patel ...................... H04L 67/55 455/452.2 |

OTHER PUBLICATIONS

Chinese Office Action and Search Report dated Sep. 7, 2022 for Chinese Application No. 201710871139.7.

* cited by examiner

METHOD, APPARATUS AND SYSTEM FOR FACILITATING TARGETED CONTENT DELIVERY

CROSS-REFERENCE TO RELATED APPLICATIONS

This application is a continuation under 35 U.S.C. § 120 of U.S. application Ser. No. 16/795,913, filed Feb. 20, 2020, which is a continuation of International Application No. PCT/GB2018/052378, filed Aug. 22, 2018 which claims priority to GB Application No. GB1713470.1, filed Aug. 22, 2017, under 35 U.S.C. § 119(a). Each of the above-referenced patent applications is incorporated by reference in its entirety.

BACKGROUND OF THE INVENTION

Technical Field

The present invention relates to network communications. In particular, but not exclusively, the present invention relates to facilitating the delivery of targeted content in service provider networks.

Background

Service provider networks, for example mobile networks, typically have a large number of registered users. Each user may have a plurality of devices that are registered in the service provider network in their name. Delivering content such as advertising content to users presents a number of problems. For example, delivering content that is irrelevant can irritate users and degrade the customer experience leading to reduced customer satisfaction. Moreover, delivering irrelevant content to users leads to ineffective campaigns for advertisers.

Hence, there is a need to deliver targeted content that is only relevant to the particular user that receives it.

Current methods of targeting content often rely on placing data on a user's devices. For example, certain methods rely on the use of "tracking cookies". Tracking cookies are files which a web browser places on a user's device to keep track of certain information such as browsing data. If a user disables cookies on their device it becomes impossible to target content using a targeted content delivery process that relies on cookies. This leads to similar problems of spamming users with irrelevant content.

SUMMARY

Certain examples described herein provide methods and systems for facilitating the delivery of targeted content to user devices in service provider networks. In certain examples described herein, measures for use in facilitating delivery of targeted content are provided. Examples do not require data to be placed on the subscriber device(s) in the service provider network. Moreover, examples do not compromise the privacy of the user's data. According to examples, any subscriber data that should remain in the service network such as personal information identifying a user, remains in the service provider network. Examples only make use of data that is already available in the network. Examples described herein have a further advantage of sending only a minimum amount of data to the service provider network to target users with content. Targeting content on the basis of users with certain user attributes is one way of ensuring that content each user receives is more relevant to them. For example, users may be targeted on the basis that they fall within a particular demographic. In another case, users' web browsing habits or product choices can be used to provide data for input into a targeted content delivery process (or 'campaign').

According to a first aspect of the invention there is provided a non-transitory computer-readable storage medium having computer readable instructions stored thereon, the computer-readable instructions being executable by a computerized device to cause the computerized device to perform a method of facilitating targeted content delivery in a network, the network comprising at least a first service provider network and a user profile data database located externally to the at least a first service provider network, wherein the user profile database comprises user profile data comprising a plurality of user entries, each user entry comprising one or more user attributes, each user attribute having a user attribute value, the method comprising: receiving, from a demand side platform via the network, segment definition data comprising a list of user attributes and corresponding user attribute values associated with a given targeted content delivery process; communicating, to a first server via the network, the segment definition data, wherein the first server has access to the user profile data database, for the first server to identify one or more candidate users to be targeted in the given targeted content delivery process based on matching the user attribute values of the segment definition data with user attribute values of respective user entries in the user profile database; receiving, from the first server via the network, a list of identifiers, wherein each identifier is usable to identify one or more candidate users to be targeted in the given targeted content delivery process; and communicating the list of identifiers to an entity in a first service provider network which is responsible for facilitating the delivery of targeted content for the given targeted content delivery process in the first service provider network.

According to a second aspect of the invention there is provided a non-transitory computer-readable storage medium having computer readable instructions stored thereon, the computer-readable instructions being executable by a system to cause the system to perform a method of facilitating targeted content delivery in a network, the network comprising at least one service provider network and a user profile data database located externally to the service provider network: the system comprising: a computerized device; and an entity in the service provider network which is responsible for facilitating the delivery of targeted content for a given targeted content delivery process in the service provider network; the method comprising, at the computerized device: receiving, from a demand side platform via the network, segment definition data comprising a list of user attributes and corresponding user attribute values associated with a given targeted content delivery process; communicating, to a first server via the network, the segment definition data, wherein the first server has access to the user profile data database, for the first server to identify one or more candidate users to be targeted in the given targeted content delivery process based on matching the user attribute values of the segment definition data with user attribute values of respective user entries in the user profile database; receiving, from the first server via the network, a list of identifiers, wherein each identifier is usable to identify one or more candidate users to be targeted in the given targeted content delivery process; and communicating the list of identifiers to an entity in the service provider network which is responsible for facilitating the delivery of targeted content for the given targeted content delivery process in the service provider network; and the method further comprising, at the entity in the service provider network: receiving the user identifiers communicated from the computerized device; and facilitating delivery of targeted content for the given targeted content delivery process in the service provider network on the basis of the received user identifiers.

According to a third aspect of the invention there is provided a system for facilitating targeted content delivery in a network, the network comprising at least one service provider network and a user profile data database located externally to the service provider network: the system comprising: a computerized device; and an entity in the service provider network which is responsible for facilitating the delivery of targeted content for a given targeted content delivery process in the service provider network; the system being configured to: at the computerized device: receive, from a demand side platform via the network, segment definition data comprising a list of user attributes and corresponding user attribute values associated with a given targeted content delivery process; communicate, to a first server via the network, the segment definition data, wherein the first server has access to the user profile data database, for the first server to identify one or more candidate users to be targeted in the given targeted content delivery process based on matching the user attribute values of the segment definition data with user attribute values of respective user entries in the user profile database; receive, from the first server via the network, a list of identifiers, wherein each identifier is usable to identify one or more candidate users to be targeted in the given targeted content delivery process; and communicate the list of identifiers to an entity in the service provider network which is responsible for facilitating the delivery of targeted content for the given targeted content delivery process in the service provider network; and at the entity in the service provider network: receive the user identifiers communicated from the computerized device; and facilitate delivery of targeted content for the given targeted content delivery process in the service provider network on the basis of the received user identifiers.

According to a first further aspect of the present disclosure there is provided a method of facilitating targeted content delivery in a network, the network comprising at least a first service provider network and a user profile data database located externally to the at least a first service provider network, wherein the user profile database comprises user profile data comprising a plurality of user entries, each user entry comprising one or more user attributes, each user attribute having a user attribute value, the method comprising: receiving, from a demand side platform via the network, segment definition data comprising a list of user attributes and corresponding user attribute values associated with a given targeted content delivery process; communicating, to a first server via the network, the segment definition data, wherein the first server has access to the user profile data database, for the first server to identify one or more candidate users to be targeted in the given targeted content delivery process based on matching the user attribute values of the segment definition data with user attribute values of respective user entries in the user profile database; receiving, from the first server via the network, a list of identifiers, wherein each identifier is usable to identify one or more candidate users to be targeted in the given targeted content delivery process; and communicating the list of identifiers to an entity in a first service provider network which is responsible for facilitating the delivery of targeted content for the given targeted content delivery process in the first service provider network.

According to a second further aspect of the present disclosure there is provided a method, executable by a system, of facilitating targeted content delivery in a network, the network comprising at least one service provider network and a user profile data database located externally to the service provider network: the system comprising: a computerized device; and an entity in the service provider network which is responsible for facilitating the delivery of targeted content for a given targeted content delivery process in the service provider network; the method comprising, at the computerized device: receiving, from a demand side platform via the network, segment definition data comprising a list of user attributes and corresponding user attribute values associated with a given targeted content delivery process; communicating, to a first server via the network, the segment definition data, wherein the first server has access to the user profile data database, for the first server to identify one or more candidate users to be targeted in the given targeted content delivery process based on matching the user attribute values of the segment definition data with user attribute values of respective user entries in the user profile database; receiving, from the first server via the network, a list of identifiers, wherein each identifier is usable to identify one or more candidate users to be targeted in the given targeted content delivery process; and communicating the list of identifiers to an entity in the service provider network which is responsible for facilitating the delivery of targeted content for the given targeted content delivery process in the service provider network; and the method further comprising, at the entity in the service provider network: receiving the user identifiers communicated from the computerized device; and facilitating delivery of targeted content for the given targeted content delivery process in the service provider network on the basis of the received user identifiers.

According to a third further aspect of the present disclosure there is provided a computerized device configured to perform a method of facilitating targeted content delivery in a network, the network comprising at least a first service provider network and a user profile data database located externally to the at least a first service provider network, wherein the user profile database comprises user profile data comprising a plurality of user entries, each user entry comprising one or more user attributes, each user attribute having a user attribute value, the method comprising: receiving, from a demand side platform via the network, segment definition data comprising a list of user attributes and corresponding user attribute values associated with a given targeted content delivery process; communicating, to a first server via the network, the segment definition data, wherein the first server has access to the user profile data database, for the first server to identify one or more candidate users to be targeted in the given targeted content delivery process based on matching the user attribute values of the segment definition data with user attribute values of respective user entries in the user profile database; receiving, from the first server via the network, a list of identifiers, wherein each identifier is usable to identify one or more candidate users to be targeted in the given targeted content delivery process; and communicating the list of identifiers to an entity in a first service provider network which is responsible for facilitating the delivery of targeted content for the given targeted content delivery process in the first service provider network.

Further features and advantages of the invention will become apparent from the following description of preferred examples of the invention, given by way of example only, which is made with reference to the accompanying drawings.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1:
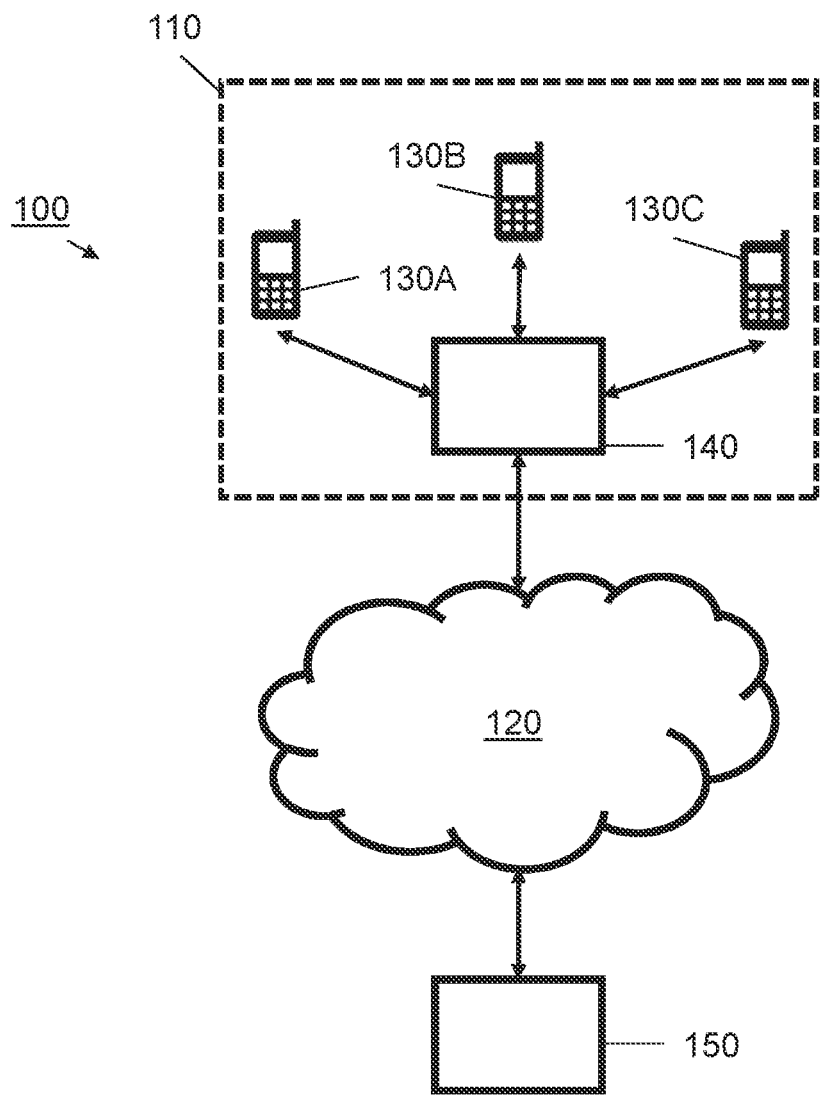
FIG. 1 is a schematic diagram showing a system for facilitating the delivery of targeted content in a service provider network, according to an example.

FIG. 1 is a simplified schematic diagram of a system 100 according to an example. Certain examples described herein are implemented within the context of system 100. In order to transmit and receive data via a telecommunications network, users conventionally subscribe to a telecommunications service provided by a telecommunications service provider. A telecommunications service typically provides access to a wider telecommunications network for a given subscriber device, a group of subscriber devices, or a residential or commercial premises network associated with a given subscriber. System 100, shown in FIG. 1, comprises a service provider network 110. According to examples described herein the service provider network 110 is a telecommunications network operated by a service provider. Service provider network 110 may for example be a mobile or web-based telecommunications network and the service provider may for example be a mobile network operator (MNO), carrier or internet service provider (ISP).

In certain examples described herein, data in the service provider network 110 is sensitive data comprising data relating to one or more users of the service provider network 110. The data associated with users in the service provider network is referred to herein as "subscriber data". When a user registers a device for use in a service provider network 110, the user may agree to terms and conditions relating to the usage of their data in the service provider network 110.

Typically, at least part of the subscriber data associated to a user should never leave the service provider network 110. For example, information that uniquely identifies a user such as their real name and address, may be made inaccessible to third parties through the service provider network 110. In particular, subscriber data in the service provider network 110 is typically not accessible to parties located externally to the service provider network 110.

In FIG. 1, the service provider network 110 is connected to a wider network 120 (or networks). Network 120 may comprise, for example, the internet or a larger telecommunications network encompassing the service provider network 110. Content may be delivered to users of the service provider network 110 via the network 120. In the service provider network 110, shown in FIG. 1, three subscriber devices 130A, 130B, 130C are shown. The subscriber devices 130 are typically endpoint devices that enable users to connect to the service provider network 110. For example, in one case the subscriber devices 130 are service provider network-enabled, mobile communications devices such as smartphones or personal computers.

The subscriber devices 130 are used to access content provided over the service provider network 110. In one example, content is accessed on the subscriber devices 130 through a browser. A browser running on a subscriber device 130 facilitates delivery of content to the subscriber device 130 from the wider network 120. In particular, a browser allows a user to run one or more browser sessions, where a user can send requests to services located outside of the service provider network 110. For example, in the case where the network 120 is the internet, a user can access a website through their browser by selecting a Uniform Resource Locator (URL) that links to the website. Selection of the URL causes the browser to send a web request to retrieve data. In another example, content is accessed on the subscriber devices 130 through an application. For example, a game running on the subscriber device 130 may be arranged to communicate content to a user in the form of data packets from the wider network 120. Such packetized data is formatted and transported according to one or more network protocols that are used in a given part of the network 120. The use of packetized data allows for efficient delivery of content to a subscriber device 130 in the service provider network 110. Examples of the kind of content delivered to the subscriber devices 130 include but are not limited to: multimedia content provided through e.g. web-based streaming services, entertainment and social media content and email and messaging services. Modern smartphones provide users with a wide variety of options for accessing content across the internet through a browser via service provider networks.

In examples described herein, content that is delivered to a subscriber device 130 shown in FIG. 1, comprises one or more advertising elements. One or more advertising elements may be inserted into a response to a web request that is received from a subscriber device 130 in the service provider network 120. Advertising elements are displayed to users (for example to generate revenue). For example, in the case where a user access an application on their subscriber device 130, the application may accrue revenue for the supplier of the application by displaying in-app advertising elements to the user.

FIG. 1 shows an entity 140 located in the service provider network 110. The entity 140 is arranged to facilitate the delivery of targeted content to the subscriber devices 130. According to examples described herein, the entity 140 is inserted in the routing fabric of the service provider network 110. The entity 140 enables data to be transmitted to an intended target in the service provider network 110. In particular, in examples described herein, subscriber data identifying users associated with the subscriber devices 130, that is not accessible outside of the service provider network 110, but which is accessible to the entity 140 inside the service provider network is used by the entity 140 to facilitate the communication of targeted content to the subscriber devices 130. In one case, advertising elements are inserted into packets received from the wider network 120. The insertion of an advertising element may be in response to an advertising request transmitted from subscriber devices 130.

FIG. 1 further shows a server entity 150 that is located externally to the service provider network 110. According to an example, the server entity 150 is a server entity of a party that wishes to display content, for example, in an application, which is being accessed by users of the subscriber devices 130. The entity 140 that is located in the server provider network 110 is arranged to deliver data received via the network 120 from the server 150. If the party in control of the server entity 150 wishes to display advertising elements to a user of the subscriber devices 130, then the party can arrange for targeted advertising content to be delivered to the service provider network 110. The entity 140 facilitates the delivery of the targeted content.

In examples described herein, the party that operates the server entity 150 may wish to target particular groups of users according to certain user attributes as part of a targeted content delivery process. For example, if a party wishes to target users as part of a targeted content delivery process such as a targeted advertising campaign, the party may specify that users who possess certain user attributes and/or should be targeted as part of the advertisement campaign. For example, a campaign may be targeted based on user demographics such as age, weight, ethnicity and/or geographical location. In other examples, users are targeted based on their usage of a particular product or service. For example, targeted content may be delivered on the basis of the number of weekly visits to a particular kind of website on the internet or the number of downloads from a particular website. Additionally, a campaign may be targeted based on brand data associated to a particular brand or financial data relating to a user such as score credit, expenditure levels, etc.

According to examples described herein, the party in control of the server entity 150 has access to certain user data relating to users that use their services and/or products. The user data can be used as a basis for a targeted content delivery process. In certain examples, one or more additional user attributes relating to data that is not available to the server entity, for example, subscriber data stored in the service provider network 110, that is only accessible in the service provider network 110, is desired to target content at subscriber devices 130 in the service provider network. This data may be more reliable than data available to the server entity. In such a case, it is desirable that data supplied to the entity 140 in the service provider network 110 is sufficient that the entity 140 is able to facilitate the delivery of targeted content for the given targeted content delivery process. Examples described herein allow content to be delivered in a targeted manner to users of subscriber devices 130 in the service provider network.

Figure 2A:
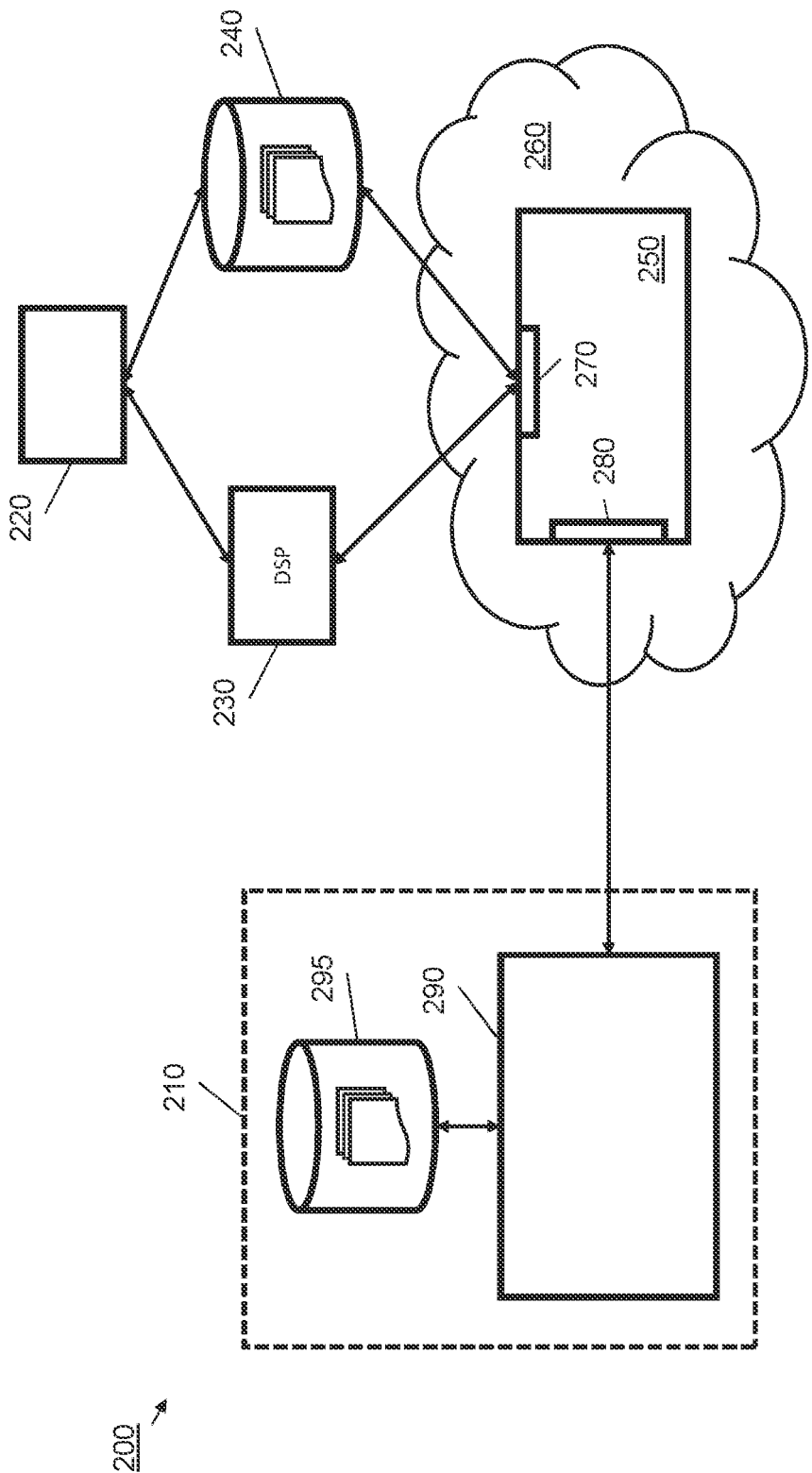
FIG. 2a is a schematic diagram showing a system for facilitating the delivery of targeted content in a service provider network, according to an example.

FIG. 2a is a schematic diagram of a system 200 according to an example. Certain examples described herein are implemented within the context of system 200. Similarly to FIG. 1, system 200 comprises a service provider network 210 that is a telecommunications network operated by a service provider such as a MNO or an ISP. A server entity 220 operated by a party wishing to deliver content to subscriber devices located in the service provider network is shown, located outside of the service provider network 210. The server entity 220 is in communication with a demand side platform (DSP) 230. The DSP 230 is a platform that is used by the server entity 220 to execute a targeted content delivery process in system 200. The DSP 230 may for example be implemented at least in part by software on the server entity 220. Alternatively, or additionally, the DSP is provided on one or more server entities located in the wider network and are accessed via the wider network by the server entity 220.

In an example case where the server entity 220 is used to deliver advertising content to subscriber devices in the service provider network 210, the DSP 230 is arranged to facilitate the purchasing of advertisement space on, for example, web-pages that are to be displayed on the subscriber devices. The DSP 230 is used by the server entity 220 to transform a request to set up a targeted content delivery process according to a particular specification, into data. This data is communicated to the wider network and is used to set up the targeted content delivery process according to the specification of the server entity 220. This data is referred to herein as "segment definition data".

FIG. 2a shows a user profile data database 240. The user profile data database comprises a plurality of user profiles. According to an example, the data stored in the user profiles of the user profile data database 240 is data provided by the server entity 220. The data is stored as a plurality of user entries, where each user entry comprises one or more user attributes. For each user attribute in a given user entry, the user attribute has a user attribute value. For example, a user attribute may be "age" or "gender". In this example, the user attribute value is the value of the attribute e.g. "age=25", "gender=male". The data provided by the server entity 220 is data that is accessible to the server entity 220 outside of the service provider network.

Accordingly, the server entity 220 is arranged to request that a particular targeted content delivery process is setup via the DSP 230. As an example, if the party operating the server entity 220 is a drinks company that wishes to promote a soft drink, the party sends a request via the server entity 220, specifying that adverts for a particular soft drink are to be targeted to users of the subscriber devices in the service provider network 210 who fall into one of the two groups of user attribute values "age=25- to 34; gender=male; soft drink consumption=moderate" and "age=10 to 15; gender=male or female; soft drink consumption=high". Once the DSP 230 has received the request from the server entity 220, it is arranged to generate the segment definition data that will be communicated to an entity in the wider network to execute the targeted advertising campaign.

FIG. 2a shows a network device 250 that is located in the wider network 260. The network device 250 comprises a network interface 270. The network interface 270 allows the network device 250 to communicate with the DSP 230. The network interface 270 also allows the network device 250 to obtain data from the user profile data database 240. The DSP 230 is arranged to communicate the segment definition data that comprises a list of user attributes and corresponding user attribute values that are associated with a given targeted content delivery process, to the network device 250.

According to some examples, the network device 250 provides a user interface to the DSP 230 through which segment definition data may be communicated to the network device 250. Segment definition data for the given targeted content delivery process is entered and recorded by the network device 250. This process may be fully automated in certain cases, without requiring input from a human operator. In examples, the DSP 230 interacts with the network device 250 through an application program interface provided by the network device 250. In certain examples, the network device 250 is software that is hosted on, for example, a cloud-based platform. Such a platform may provide storage and processing facilities which are used by the network device 250 to process the segment definition data received from the DSP 230.

The network device 250 is arranged to access, via the network interface 260, user profile data from the user profile data database 240. According to one example, the network device 250 is arranged to access user profile data in response to the receipt of segment definition data for a given targeted content delivery process. The network device 250 is arranged to retrieve the accessed data and process the data to identify users in the user profile database 240, as part of a targeted content delivery process.

According to examples described herein, the network device 250 is arranged to determine, for each user identified in the accessed user profile data, whether the user is to be included in a list of candidate users to be targeted in the given targeted content delivery process. A user is determined to be in the list of candidate users that are to be targeted, when the user attribute values of the respective user entry match user attribute values from the segment definition data received from the DSP 230. In the example given previously, where the segment definition data comprised a category "age=25 to 35; gender=male, soft drink consumption=moderate", all those entries in the user profile data database with attribute values matching those of the respective attribute values for "age", "gender" and "soft drink consumption" are determined to be included in the list of candidate users to be targeted in the targeted content delivery process, by the network device 250.

In some examples, the entity 220 acts as a third party data source which is not itself concerned with setting up a targeted content delivery process. In such examples, the entity 220 may not supply the data itself but may provide data which is used by, for example, an advertiser as part of a targeted content delivery process.

According to examples herein, one or more user identifiers are included in user profile data database entries each of which may be used to identify one or more user entries in the user profile data database 240. Each of the one or more user identifiers do not identify an actual user e.g. by name and address, but instead provide an ID to one or more user entries in the user profile data database 240 which may be used at a later point in time to target the one or more users. In some examples each of the one or more user identifiers may provide an ID to a plurality of entries in the user profile data database 240. In other examples, each of the one or more user identifiers may provide a unique ID to an entry in the user profile data database 240. The network device 250 is arranged to output a candidate list of user identifiers for those users that are candidate users to be targeted in the targeted content delivery process.

In FIG. 2a, the network device 250 comprises a further network interface 280. The network interface 280 is arranged to facilitate communication between the network device 250 and the service provider network 210. Specifically, the network device 250 uses the network interface 280 to communicate with an entity 290 in the service provider network 210. Similarly to the entity 140 shown in FIG. 1, the entity 290, which is located in the service provider network 210, is responsible for facilitating delivery of targeted content to subscriber devices in the service provider network 210. The entity 290 is located in the routing fabric of the service provider network 210 and is arranged to place content in the traffic that flows between the wider network 260 and the service provider network 210. According to examples described herein, the network device 250 is arranged to communicate, via the network interface 280, the previously determined list of user identifiers, each user identifier for one or more user entries in the list of candidate users to the entity 290.

The entity 290 in the service provider network is arranged to receive the user identifiers communicated from the network device 250 and facilitate the delivery of targeted content for the targeted content delivery process in the service provider network 210 on the basis of (at least) the received user identifiers. The entity 290 may use the received identifiers to identify one or more candidate users to be targeted in the given targeted content delivery process. According to examples, facilitation of the delivery of targeted content involves the insertion of identifiers into data packets such that content may be delivered to subscriber devices.

According to an example, in addition to the user identifiers that are communicated by the network device 250, the network device 250 is arranged to communicate further segment definition data comprising one or more further user attributes and corresponding user attribute values to the entity 290 in the service provider network 210, via the network interface 280. The further user attributes, in one case, are user attributes relating to subscriber data of subscriber devices in use in the service provider network 210. In particular, the further user attributes are, in certain cases, attributes for which the attribute values are not available to entities located outside of the service provider network.

For an attribute where the attribute values are not available to entities located outside of the service provider network 210, it is not possible to identify users by filtering the data at the network device 250. Instead the entity 290, in the service provider network 210, is arranged to access subscriber data, shown in FIG. 2a in a subscriber data database 295. The entity 290 in the service provider network 210 receives the further segment definition data from the network device 250. The entity 290 is arranged to, identify, on the basis of subscriber data available to the entity 210 and for each user identified in the subscriber data using the user identifiers that are communicated by the network device 250, whether the user is to be included in a list of subscribers to be targeted in the given targeted content delivery process. A user is determined to be in the list of subscribers to be targeted if the user attribute values of the respective user entry of the subscriber data match user attribute values from the further segment definition data.

In relation to the previously described example, in addition to the list of user identifiers comprising users that are determined to be "age=25 to 34; gender=male; soft drink consumption=moderate", the further segment definition data may include, for example, the attributes "phone number", "postcode" or "national insurance number" and attribute values to be any phone numbers starting with "001", postcode starting with "AAA" and national insurance numbers starting with "XX". One or more of these attributes may correspond to attributes relating to user attribute values not available to the network device 250, for example phone numbers of subscriber devices located in the service provider network. Hence, the equivalent filtering process for these attributes is executed at the entity 290 which can access the attribute values stored in the subscriber data database 295. In some examples, the further segment definition data relates to attributes for which the corresponding attribute values are not contained in the user profile data database.

Figure 2B:
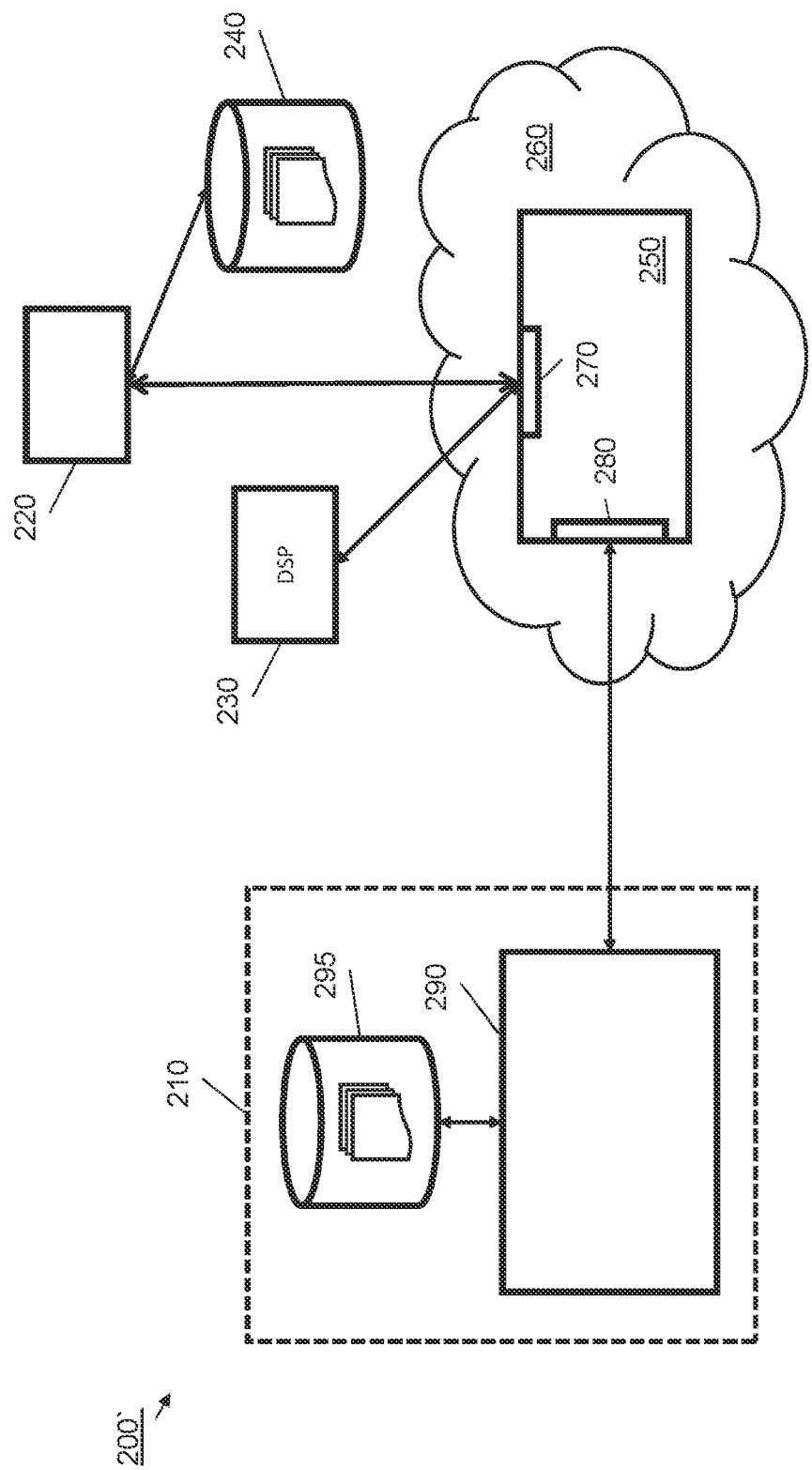
FIG. 2b is a schematic diagram showing a system for facilitating the delivery of targeted content in a service provider network, according to another example.

FIG. 2*b* is a schematic diagram of a system 200' according to a further example. The system 200' comprises the same components as the system 200 illustrated in FIG. 2*a* and those components are given the same reference numerals in FIG. 2*b* as they are in FIG. 2*a*.

As described above, in the system 200 described with respect to FIG. 2*a*, the network device 250 is arranged to access, via the network interface 260, user profile data from the user profile database 240 in response to the receipt from the DSP 230 of the segment definition data.

In contrast, in the system 200' illustrated in FIG. 2*b*, the network device 250 is unable to directly access the user profile data from the user profile database 240. Instead, in the system 200', the user profile data from the user profile database 240 is only accessible by the server entity 220. This may occur, for example, if the operator of the server entity 220 is unwilling to provide direct access to the operator of the network device 250 of the user profile data in the user profile database 240.

In the system 200', in response to the receipt, via the network interface 260, from the DSP 230 of the segment definition data, the network device 250 is arranged to record the segment definition data and forward the segment definition data, via the network interface 260, to the server entity 220.

In this example, the server entity 220 receives the segment definition data from the network device 250 and, in response to receiving the segment definition data, the server entity 220 accesses user profile data in the user profile database 240. Similarly to the network device 250 in the system 200 in FIG. 2*a*, the server entity 220 in the system 200' in FIG. 2*b* is arranged to determine, for each user identified in the accessed user profile data, whether the user is to be included in a list of candidate users to be targeted in the given targeted content delivery process. Again, as described above, a user is determined to be in the list of candidate users that are to be targeted, when the user attribute values of the respective user entry match user attribute values from the segment definition data received.

Again, in this example, one or more user identifiers are included in the user profile data database entries that each of which may be used to identify one or more user entries in the user profile data database 240. Again, the one or more user identifiers do not identify an actual user e.g. by name and address, but instead provide an ID to one or more user entries in the user profile data database 240 which may be used at a later point in time to target the one or more users. The server entity 220 is arranged to output a candidate list of user identifiers for those users that are candidate users to be targeted in the targeted content delivery process. The server entity 220 is further arranged to send the list of user identifiers to the network device 250.

The network device 250 receives the list of user identifiers from the server entity 220 via the network interface 270. As in the example of FIG. 2*a*, the network device 250 is arranged to communicate, via the network interface 280, the list of user identifiers to the entity 290. Again, in addition to the list of user identifiers, the network device 250 is arranged to communicate further segment definition data comprising one or more further user attributes to the entity 290 in the service provider network 210, via the network interface 280. The further user attributes, in one case, are user attributes relating to subscriber data of subscriber devices in use in the service provider network 210. In particular, the further user attributes are, in certain cases, attributes for which the attribute values are not available to entities located outside of the service provider network 210.

The entity 290 receives the list of user identifiers and the further user attributes and makes use of this information in the same way as in the example of FIG. 2*a*.

Figure 3:
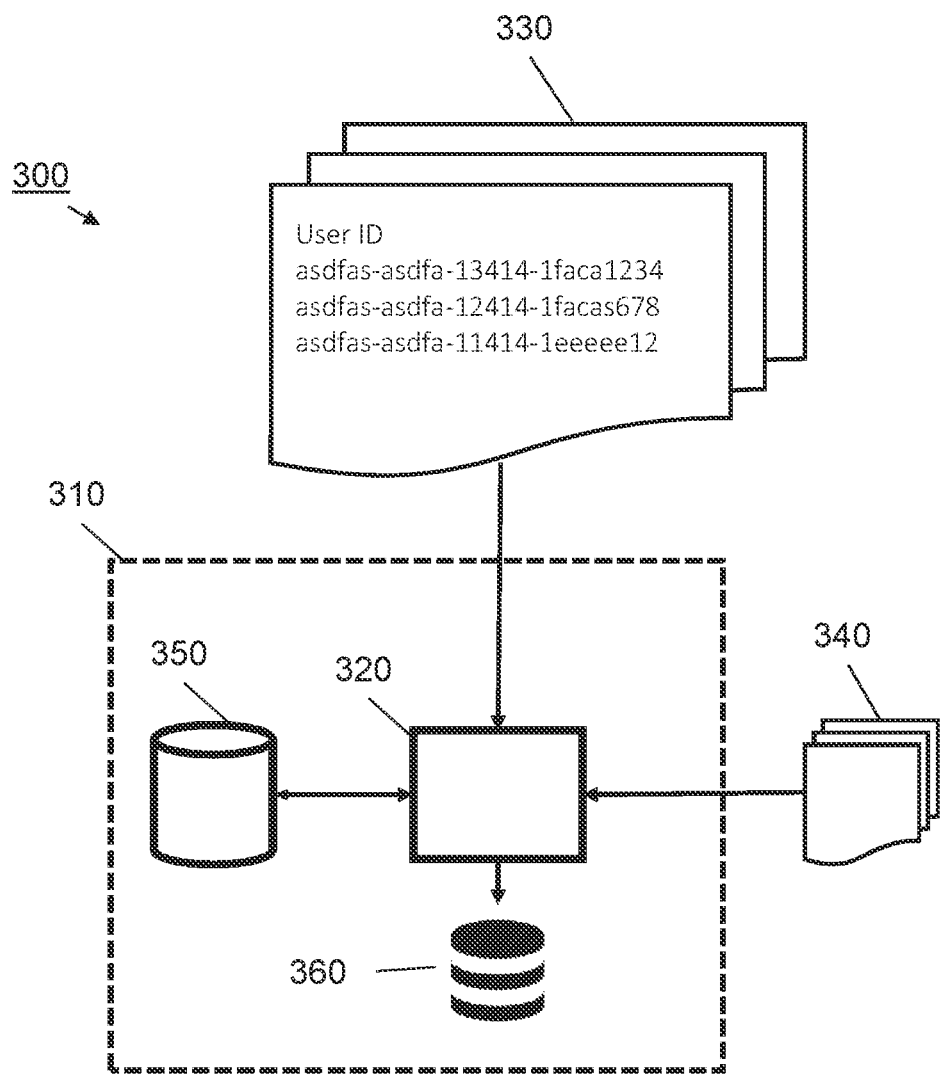
FIG. 3 is a schematic diagram showing an entity in a service provider network for facilitating the delivery of targeted content according to an example.

FIG. 3 is a schematic diagram showing a system 300 that is arranged to process data in a service provider network. FIG. 3 shows a service provider network 310 similar to that shown in FIGS. 1 and 2. The service provider network 310 is communicatively coupled to a wider network (or networks) (not shown in FIG. 3) similar to those shown in FIGS. 1 and 2. FIG. 3 shows an entity 320 located in the service provider network 310 that is arranged to facilitate the delivery of targeted content to subscriber devices in the service provider network 310 on the basis of data received from the wider network. The entity 320 receives a list 330 comprising a plurality of user identifiers. Each user identifier is included in the list 330, where one or more users associated with the identifier has been determined as a candidate user for a targeted content delivery process. The list of user identifiers 330 may for example be based on segment definition data received from a DSP by a network device located in the wider network and external to the service provider network 310.

In FIG. 3, the entity 320 also receives further segment definition data 340 that comprises a list of further user attributes and user attribute values as previously described. The entity 320 is arranged to access a subscriber data database 350 that is located in the service provider network 310. As previously indicated, the subscriber data is data that is stored by the service provider of the service provider network 310, in relation to subscriber devices that utilize the service provider network. Typically, the subscriber data stored in the database 350 comprises data that should remain within the service provider network 310 (for example, data which uniquely identifies the users of subscriber devices). Additionally, the subscriber data may comprise further data which is available both inside and outside of the service provider network 310.

The entity 320 is arranged to identify, on the basis of subscriber data available to the entity 320 in the first service provider network, for each user identified in the subscriber data, whether the user is to be included in a list of subscribers to be targeted in the given targeted content delivery process. A user is determined to be in the list of subscribers to be targeted if the user attribute values of the respective user entry of the subscriber data match user attribute values from the further segment definition data.

In relation to the previously described example, in addition to the list of user identifiers comprising users that are determined to be "age=25 to 34; gender=male; soft drink consumption=moderate", the further segment definition data may include, for example, the attributes "phone number", "postcode" or "national insurance number", corresponding to attributes that are to be found in the subscriber data database 350 and which are not available outside of the service provider network 310. In an example, a (range of) attribute value(s) comprising all phone numbers starting with "001" is included in the further segment definition data. The entity 320 is arranged to identify in the subscriber data all those subscriber entries for which the phone number starts with "001" and to include the corresponding user in a list of subscribers to be targeted.

In the example shown in FIG. 3, the entity 320 is further arranged to output data 360 comprising a list of users that are identified as the users that will be targeted in the targeted content delivery process. In particular, the list 360 comprises those users that are identified as subscribers to be targeted, and also for which the corresponding user identifier for the user is included on the list of candidate users 340 received from the network device in the wider network. The entity 320 is arranged to deliver targeted content to these users.

Examples comprise apparatus for use in facilitating targeted content delivery in a network, the network comprising at least one service provider network and a user profile data database located externally to the service provider network, the apparatus being configured to at an entity in a service provider network:
- receive user identifiers communicated from a network device located externally to the service provider network; and
- facilitates the delivery of targeted content for a given targeted content delivery process in the service provider network on the basis of the received user identifiers,
- the user identifiers having been determined on the basis of user profile data accessed via the network, the user profile data having been accessed, via the network, by the network device, from the user profile data database,
- the user identifiers having been determined by the network device on the basis of segment definition data received from a demand side platform via the network, the segment definition data comprising a list of user attributes and corresponding user attribute values associated with a given targeted content delivery process.

The apparatus may for example comprise entity 320.

In some examples, the facilitating is carried out further on the basis of data comprised in a subscriber data database located within the service provider network.

Figure 4:
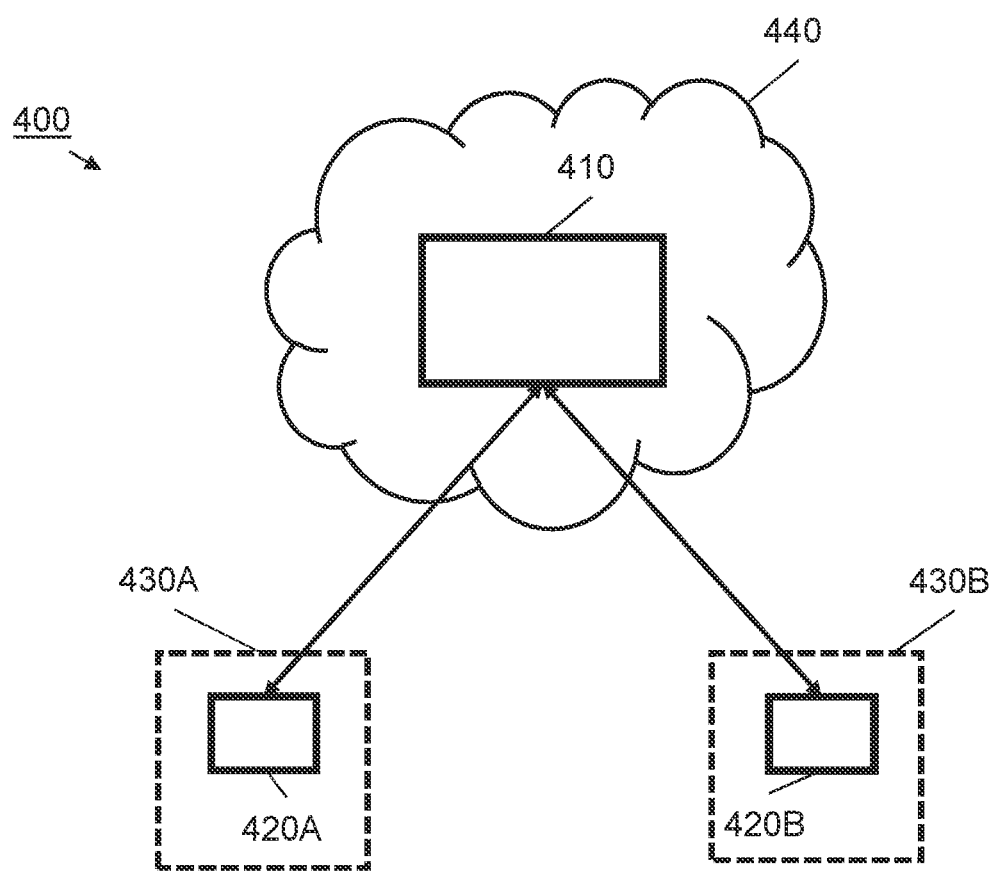
FIG. 4 is a schematic diagram showing a system for facilitating the delivery of targeted content to service provider networks, according to an example.

FIG. 4 is a simplified schematic diagram of a system 400 for delivering content in a targeted content delivery process according to an example. Certain examples described herein may be implemented within the context of system 400. In FIG. 4, a network device 410 is shown. The network device 410 is in communication with entities 420A, 420B located in service provider networks 430A and 430B. The network device 410 is located outside each of the service provider networks 430 in a wider network 440.

The entities 420 and service provider networks 430 are similar to those described previously in relation to FIGS. 1, 2a and 2b and 3. Subscriber data corresponding to users that are using subscriber devices in the service provider networks 430 is not, in general, available to parties or entities located outside of the service provider networks 430. Similarly, the subscriber data for the service provider network 430A is not available to the service provider network 430B and vice versa.

According to an example, the network device 410 is arranged to facilitate the delivery of targeted content data for a targeted content delivery process to subscriber devices located in each of the service provider networks 430 in a manner similar to that described in relation to the network device 250 shown in FIG. 2a. In particular, the network device 410 may be arranged to determine, whether a user is to be included in a list of candidate users to be targeted in the given targeted content delivery process, where a user is determined to be in the list of candidate users to be targeted if the user attribute values of the respective user entry match user attribute values in segment definition data received from a DSP (not shown in FIG. 4).

For a given targeted content delivery process that is implemented on system 400, according to a first example, the list of user identifiers communicated to the entity 420A located in the service provider network 430A is the same list of user identifiers that is communicated to the entity 420B located in service provider network 430B (as long as they are relevant, for example, based on relevant geographical location). In a second example, a first list of candidate users is determined for the first service provider network 430A by the network device 410 and a second list of candidate users is determined for the second service provider network 430B. Each of the lists is communicated to the respective entities 420A and 420B. In examples, the network device 410 is arranged to communicate further segment definition data relating to, for example, the geographical locations of entities 420 in the respective service provider networks 430. As described in relation to system 300 shown in FIG. 3, the entities 420 in the service provider networks 430 are arranged to perform a similar filtering process on the subscriber data to that which is performed on the user profile data, to filter the subscribers to only those that are to be targeted in the given targeted content delivery process.

According to an example, where a user operates subscriber devices in more than one service provider network 430, one or more of the user attributes in the accessed user profile data or in the received segment definition data specifies one or more service provider networks of the user. In a further example, one or more of the user attributes in the accessed user profile data or in the received segment definition data specifies a geographical location of one or more users (for example a country where a user is currently located).

Figure 5A:
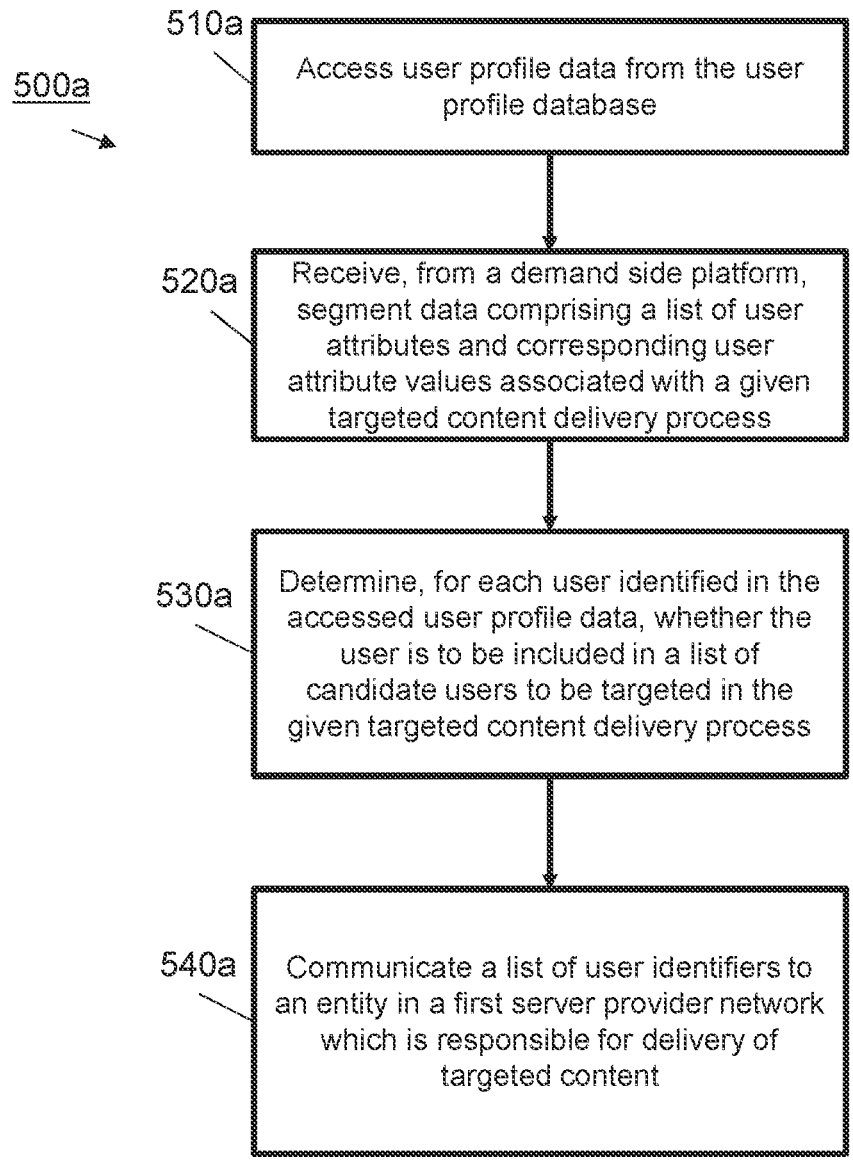
FIG. 5a is a flow diagram showing a method of facilitating delivery of targeted content according to an example.

FIG. 5a is a flow diagram showing a method 500a of facilitating the delivery of targeted content data according to an example. The method 500a, which is shown in FIG. 5a may be used in conjunction with any of systems 100-400 shown in FIGS. 1 to 4. In particular, the method 500a is used to facilitate the delivery of targeted content in service provider networks according to examples described herein. As described in relation to FIG. 2a, when system 200 implements method 500a, the network device 250 is arranged to implement the steps shown in FIG. 5. At block 510a, user profile data from a user profile data database is accessed. At block 520a, segment definition data comprising a list of user attributes and corresponding user attribute values associated with a given targeted content delivery process is received. At block 530a, a determination, for each user identified in the accessed user profile data, of whether the user is to be included in a list of candidate users to be targeted in the given targeted content delivery process is executed. At block 540a, a list of user identifiers is communicated to an entity in a first server provider network which is responsible for facilitating the delivery of targeted content e.g. the entities 290, 320 and 420 shown in FIGS. 2 to 4. Each user identifier is usable to identify one or more candidate users in the list of candidate users. According to an example, the method 500a is implemented whenever data in the user profile data database is updated since the list of user identifiers that are to be targeted as part of a targeted content delivery process is subject to change in the case where profile data is added, updated or deleted from the database.

Figure 5B:
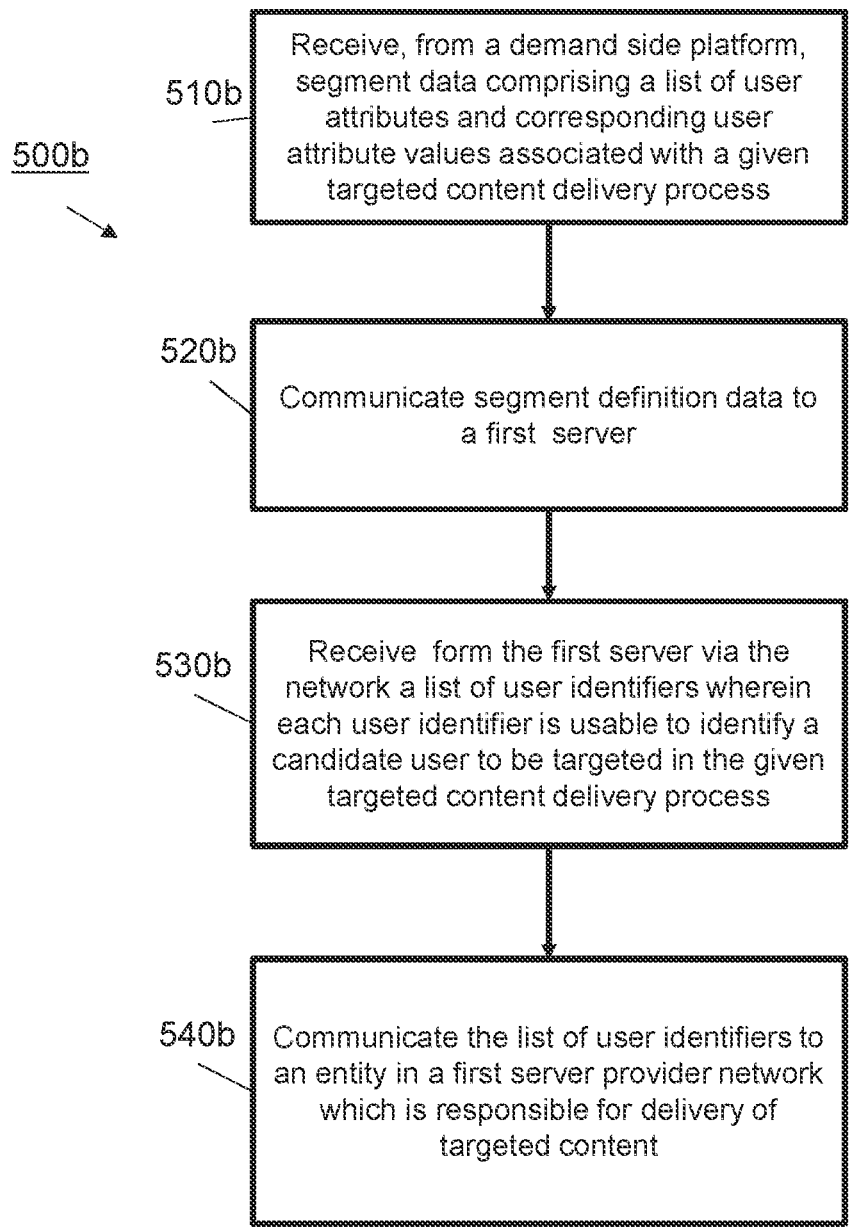
FIG. 5b is a flow diagram showing a method of facilitating delivery of targeted content according to an example.

FIG. 5b is a flow diagram showing a method 500b of facilitating the delivery of targeted content data according to another example. The method 500b, which is shown in FIG. 5b may be used in conjunction with any of systems 100-400 shown in FIGS. 1 to 4. In particular, the method 500a is used to facilitate the delivery of targeted content in service provider networks according to examples described herein. As described in relation to FIG. 2b, when system 200' implements method 500b, the network device 250 is arranged to implement the steps shown in FIG. 5b. At block 510b, segment definition data comprising a list of user attributes and corresponding user attribute values associated with a given targeted content delivery process is received. At block 520b, the segment definition data is communicated to a first server via the network for the first server to access a user profile data database to identify one or more candidate users to be targeted in the given targeted content delivery process based on matching the user attribute values of the segment definition data with user attribute values of respective user entries in the user profile database. At block 530b, a list of user identifiers is received from the first server and each user identifier is usable to identify one or more candidate users to be targeted in the given targeted content delivery process. At block 540b, the list of user identifiers is communicated to an entity in a first server provider network which is responsible for facilitating the delivery of targeted content e.g. the entities 290, 320 and 420 shown in FIGS. 2 to 4. According to an example, the method 500a is implemented whenever data in the user profile data database is updated since the list of user identifiers that are to be targeted as part of a targeted content delivery process is subject to change in the case where profile data is added, updated or deleted from the database.

Figure 6:
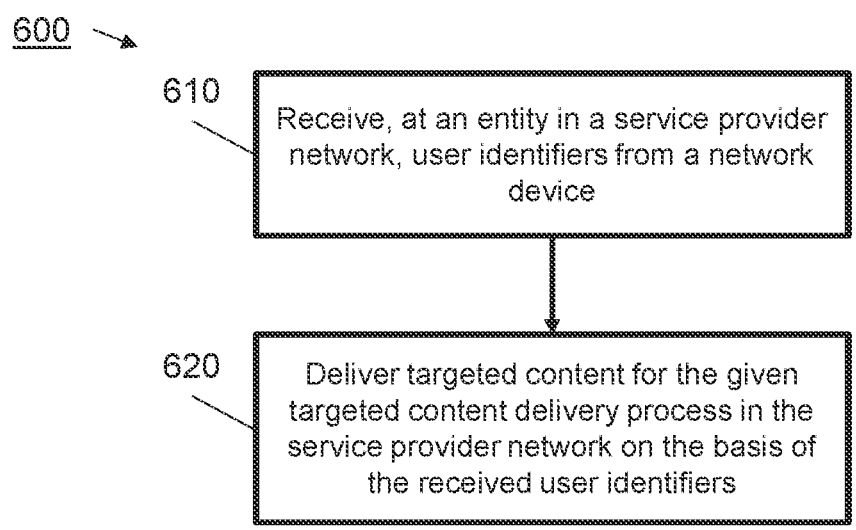
FIG. 6 is a flow diagram showing a method of delivering targeted content according to an example.

FIG. 6 is a flow diagram showing a method 600 of delivering targeted content data according to an example. The method 600 which is shown in FIG. 6 may be used in conjunction with any of systems 100-400 shown in FIGS. 1 to 4. The method 600 may also be used in conjunction with the method 500 shown in FIG. 5. In particular, the method 600 is implemented on an entity in a service provider network to deliver targeted content, on the basis of data received from a network device that implements the method 500 shown in FIG. 5, according to an example. At block 610, identifiers from a network device is received at an entity in a service provider network, wherein each identifier is usable to identify one or more candidate users to be targeted in a given targeted content delivery process. Block 620 involves facilitating the delivery of targeted content for the given targeted content delivery process to the service provider network on the basis of the received user identifiers.

Figure 7:
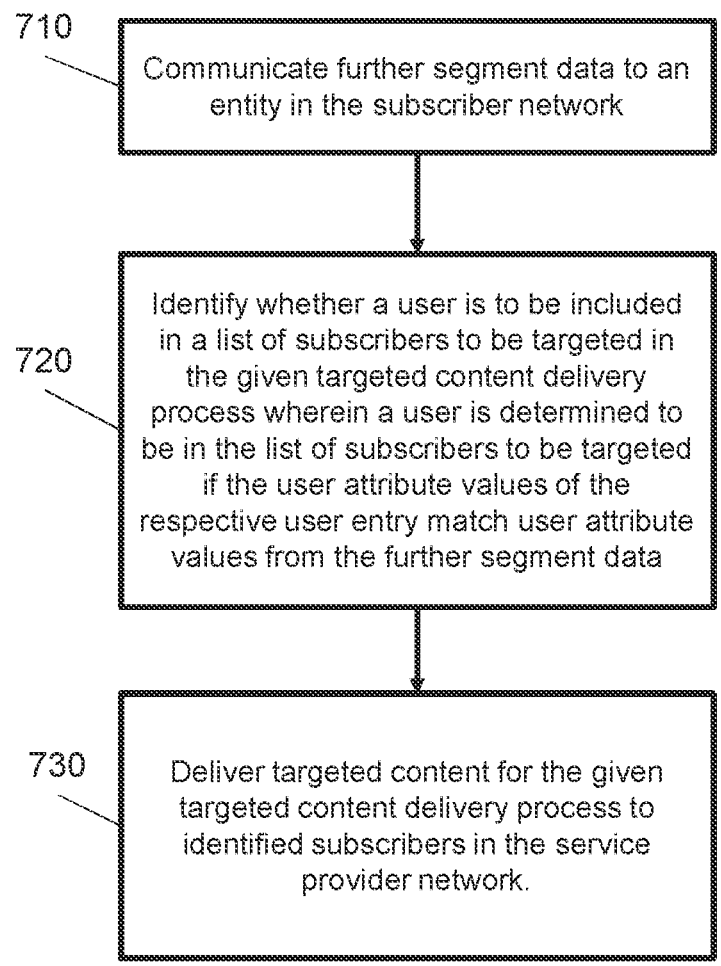
FIG. 7 is a flow diagram showing a method of delivering targeted content according to an example.

FIG. 7 is a block diagram showing a method 700 of delivering targeted content data according to an example. The method 700, which is shown in FIG. 7 may be used in conjunction with any of systems 100-400 shown in FIGS. 1 to 4. The method 700 may also be used in conjunction with the methods 500 and 600 shown in FIGS. 5 and 6 to deliver targeted content to users in the service provider network. At block 710, further segment definition data is communicated to the entity in the subscriber network. At block 720, a determination of whether a user is to be included in a list of subscribers to be targeted in the given targeted content delivery process on the basis of whether the user attribute values of the respective user entry, in the subscriber data match user attribute values from the received further segment definition data. Block 730 involves facilitating targeted content delivery for the given targeted content delivery process to the identified subscribers in the service provider network.

Further examples of the present invention will now be described. In one further example, referring to FIG. 2a, rather than performing the step of determining whether a user is to be included in a list of candidate users at a network device 250, located in the wider network 260, the segment definition data is communicated to the entity 290 in the service provider network. In this example, the entity 290 retrieves the data from the user profile data database and determines for each user identified in the accessed user profile data, whether the user is to be included in a list of candidate users to be targeted in the given targeted content delivery process. In other words, the entity 290 in the service provider network 210 performs the steps that, in other examples are executed at the network device 250. In this example less data is communicated from the network device 250 to the entity 290, since only the segment definition data is sent to the entity 290.

In a further example, again referring to FIG. 2a, the entity 290 in the service provider network is provided with a token for the given targeted content delivery process which is used to retrieve filtered data from the user profile data database. In this example, a list of user identifiers corresponding to a list of candidate users that are to be targeted as part of the targeted content delivery process is communicated directly from the user profile data database 240 to the entity 290 in the service provider network 210. The entity 290 in the service provider network 210 is arranged to determine which users are to be targeted on the basis of the received user identifiers and the subscriber data in a similar fashion to how the entity 290 determined which users were to be targeted in previous examples. This example has an advantage that less data is communicated from either the user profile data database 240 to the entity in the service provider network, or the network device 250 in the wider network; this is because there is additional processing carried out on the data in the user profile data database 240.

In further examples described herein, a targeted content delivery process is performed without the use of a DSP.

Examples described herein enable delivery of targeted content to users in a service provider network. Approaches that rely on placing data such as cookies on a subscriber device such that targeted content may be delivered to the subscriber device have a disadvantage that a user must initially browse to a webpage, for example, that allows the cookie to be placed on their device. Data in digital user profiles associated to cookies may be inaccurate due to the unverified nature of the data which leads to poor quality targeting. Furthermore, a user who disables cookies on their device automatically prevents any attempt to deliver targeted content. Examples described herein do not rely on the use of additional data being placed on the user devices. This has numerous technical advantages over known approaches, since content can be targeted at the user irrespective of the user's browsing preferences. Moreover, examples described herein still allow useful targeting of content even in scenarios where data identifying subscribers does not leave the service provider network. This is achieved at least partly by placing an entity in the service provider network. This guarantees precision targeting of content without comprising on the security and privacy of user data. Examples described herein do not expose a user's personal data to potentially untrusted third parties.

Examples described herein involve one or more nodes, entities or devices which comprise a processor or processing system for performing various data processing tasks. In examples, the processing system comprises one or more processors and/or memory. Each device as described in relation to any of the examples described above may similarly comprise a processor and/or processing system. One or more of the aspects of the examples described herein with reference to the drawings comprise processes performed one or more nodes, entities or devices. In examples, one or more nodes, entities or devices comprises one or more processing systems or processors configured to carry out these processes. In this regard, examples may be implemented at least in part by computer software stored in (non-transitory) memory and executable by the processor, or by hardware, or by a combination of tangibly stored software and hardware (and tangibly stored firmware). Examples also extend to computer programs, particularly computer programs on or in a carrier, adapted for putting the above described examples into practice. The program may be in the form of non-transitory source code, object code, or in any other non-transitory form suitable for use in the implementation of processes according to examples. The carrier may be any entity or device capable of carrying the program, such as a RAM, a ROM, or an optical memory device; etc.

An example comprises a computer program comprising a set of instructions, which, when executed by a computerised device, cause the computerised device to perform a method for use in facilitating targeted content delivery in a network, the network comprising at least one service provider network and a user profile data database located externally to the service provider network, the method comprising accessing, via the network, user profile data from the user profile database comprising a plurality of user entries, each user entry comprising one or more user attributes, each user attribute having a user attribute value, receiving, from a demand side platform via the network, segment definition data comprising a list of user attributes and corresponding user attribute values associated with a given targeted content delivery process; determining, for each user identified in the accessed user profile data, whether the user is to be included in a list of candidate users to be targeted in the given targeted content delivery process, wherein a user is determined to be in the list of candidate users to be targeted if the user attribute values of the respective user entry match user attribute values from the received list, and communicating user identifiers for each user entry in the list of candidate users to an entity in a first service provider network which is responsible for delivering targeted content for the given targeted content delivery process in the first service provider network.

The above examples are to be understood as illustrative examples of the invention. Further examples of the invention are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A non-transitory computer-readable storage medium having computer readable instructions stored thereon, the computer-readable instructions being executable by a system to cause the system to perform a method of facilitating targeted content delivery in a network, the network comprising at least one service provider network comprising a first service provider network and a user profile data database located externally to the first service provider network:
   the system comprising:
      a network device located externally to the first service provider network; and
      an entity in the service provider network which is responsible for facilitating the delivery of targeted content for a given targeted content delivery process in the first service provider network;
   the method comprising, at the network device located externally to the first service provider network:
      receiving, from a demand side platform via the network, segment definition data comprising a list of user attributes and corresponding user attribute values associated with a given targeted content delivery process;
      communicating, to a first server via the network, the segment definition data, wherein the first server has access to the user profile data database, for the first server to identify one or more candidate users to be targeted in the given targeted content delivery process based on matching the user attribute values of the segment definition data with user attribute values of respective user entries in the user profile database;
      receiving, from the first server via the network, a list of identifiers, wherein each identifier is usable to identify one or more candidate users to be targeted in the given targeted content delivery process;
      communicating the list of identifiers to an entity in the first service provider network which is responsible for facilitating the delivery of targeted content for the given targeted content delivery process in the first service provider network; and
      communicating further segment definition data comprising a list of one or more further user attributes and corresponding user attribute values to the entity in the first server provider network responsible for the delivery of targeted content, wherein at least one user attribute in the further segment definition data is different from the user attributes of the segment definition data;
   the method further comprising, at the entity in the first service provider network:
      receiving the list of identifiers and the further segment definition data communicated from the network device;
      identifying, on the basis of subscriber data available to the entity in the first service provider network, for each user identified in the subscriber data, whether the user is to be included in a list of subscribers to be targeted in the given targeted content delivery process, wherein a user is determined to be in the list of subscribers to be targeted if the user attribute values of the respective user entry of the subscriber data match user attribute values from the further segment definition data; and
      facilitating delivery of targeted content for the given targeted content delivery process in the first service provider network on the basis of the received user identifiers.

2. The non-transitory computer-readable storage medium according to claim 1, wherein the corresponding user attribute values for the further segment definition data are available to the entity in the first service provider network.

3. The non-transitory computer-readable storage medium according to claim 1, wherein the corresponding user attribute values for the further segment definition data are not available to the network device located externally to the service provider network.

4. The non-transitory computer-readable storage medium according to claim 1, wherein the network comprises a second, different service provider network and wherein communicating the list of identifiers further comprises communicating the list of identifiers to an entity in the second service provider network which is responsible for facilitating the delivery of targeted content for the given targeted content delivery process in the second service provider network.

5. The non-transitory computer-readable storage medium according to claim 1, wherein the network comprises a second, different service provider network and wherein communicating the list of identifiers further comprises communicating the list of identifiers to an entity in the second service provider network which is responsible for facilitating the delivery of targeted content for the given targeted content delivery process in the second service provider network; and wherein the method comprises communicating the further segment definition data to the entity in the second server provider network responsible for facilitating the delivery of targeted content.

6. The non-transitory computer-readable storage medium according to claim 4, wherein at least a portion of the received segment definition data is specific to a country associated to a service provider network, and wherein at least one determined candidate user to be targeted in the first service provider network is different from at least one determined user to be targeted in the second service provider network.

7. The non-transitory computer-readable storage medium according to claim 6, wherein at least a portion of the received segment definition data relates to a geographical location of the entity in the first service provider network or the entity in the second service provider network.

8. The non-transitory computer-readable storage medium according to claim 1, wherein one or more of the user attributes in the accessed user profile data or in the received segment definition data specifies a geographical location of one or more users; and/or
wherein one or more of the user attributes in the accessed user profile data or in the received segment definition data comprise one or more of:
age,
gender,
geographical location,
language,
financial data relating to the user,
data relating to subscriber devices of the user, and
user interests.

9. A system for facilitating targeted content delivery in a network, the network comprising at least one service provider network comprising a first service provider network and a user profile data database located externally to the first service provider network:
the system comprising:
a network device located externally to the first service provider network; and
an entity in the service provider network which is responsible for facilitating the delivery of targeted content for a given targeted content delivery process in the first service provider network;
the system being configured to:
at the network device located externally to the first service provider network:
receive, from a demand side platform via the network, segment definition data comprising a list of user attributes and corresponding user attribute values associated with a given targeted content delivery process;
communicate, to a first server via the network, the segment definition data, wherein the first server has access to the user profile data database, for the first server to identify one or more candidate users to be targeted in the given targeted content delivery process based on matching the user attribute values of the segment definition data with user attribute values of respective user entries in the user profile database;
receive, from the first server via the network, a list of identifiers, wherein each identifier is usable to identify one or more candidate users to be targeted in the given targeted content delivery process;
communicate the list of identifiers to an entity in the first service provider network which is responsible for facilitating the delivery of targeted content for the given targeted content delivery process in the first service provider network; and
communicate further segment definition data comprising a list of one or more further user attributes and corresponding user attribute values to the entity in the first server provider network responsible for the delivery of targeted content, wherein at least one user attribute in the further segment definition data is different from the user attributes of the segment definition data;
at the entity in the service provider network:
receive the list of identifiers and the further segment definition data communicated from the network device;
identify, on the basis of subscriber data available to the entity in the first service provider network, for each user identified in the subscriber data, whether the user is to be included in a list of subscribers to be targeted in the given targeted content delivery process, wherein a user is determined to be in the list of subscribers to be targeted if the user attribute values of the respective user entry of the subscriber data match user attribute values from the further segment definition data; and
facilitate delivery of targeted content for the given targeted content delivery process in the first service provider network on the basis of the received user identifiers.

10. The system according to claim 9, wherein the corresponding user attribute values for the further segment definition data are available to the entity in the first service provider network.

11. The system according to claim 9, wherein the corresponding user attribute values for the further segment definition data are not available to the network device located externally to the service provider network.

12. The system according to claim 9, wherein the network comprises a second, different service provider network and wherein communicating the list of identifiers further comprises communicating the list of identifiers to an entity in the second service provider network which is responsible for facilitating the delivery of targeted content for the given targeted content delivery process in the second service provider network.

13. The system according to claim 12, wherein at least a portion of the received segment definition data is specific to a country associated to a service provider network, and wherein at least one determined candidate user to be targeted in the first service provider network is different from at least one determined user to be targeted in the second service provider network.

14. The system according to claim 13, wherein at least a portion of the received segment definition data relates to a geographical location of the entity in the first service provider network or the entity in the second service provider network.

15. The system according to claim 9, wherein the network comprises a second, different service provider network and wherein communicating the list of identifiers further comprises communicating the list of identifiers to an entity in the second service provider network which is responsible for facilitating the delivery of targeted content for the given targeted content delivery process in the second service provider network; and wherein the method comprises communicating the further segment definition data to the entity in the second server provider network responsible for facilitating the delivery of targeted content.

16. The system according to claim 9, wherein one or more of the user attributes in the accessed user profile data or in the received segment definition data specifies a geographical location of one or more users; and/or wherein one or more of the user attributes in the accessed user profile data or in the received segment definition data comprise one or more of:

age,
gender,
geographical location,
language,
financial data relating to the user,
data relating to subscriber devices of the user, and
user interests.

\* \* \* \* \*